United States Patent [19]

Hoppe et al.

[11] Patent Number: 5,160,348

[45] Date of Patent: Nov. 3, 1992

[54] MIXTURES OF BLUE AZO DISPERSE DYESTUFFS

[75] Inventors: Manfred Hoppe, Kuerten; Dieter Wiegner, Odenthal; Klaus-Peter Sagner; Heinz D. Jordan, both of Leverkusen; Horst Brandt, Odenthal, all of Fed. Rep. of Germany

[73] Assignee: Bayer Aktiengesellschaft, Leverkusen, Fed. Rep. of Germany

[21] Appl. No.: 809,833

[22] Filed: Dec. 17, 1991

Related U.S. Application Data

[63] Continuation of Ser. No. 362,912, Jun. 8, 1989, abandoned.

[30] Foreign Application Priority Data

Jun. 24, 1988 [DE] Fed. Rep. of Germany ....... 3821338

[51] Int. Cl.$^5$ .................... C09B 67/22; D06P 1/18
[52] U.S. Cl. ........................... 8/639; 534/573; 8/524; 8/550
[58] Field of Search ............ 534/573 M; 8/639

[56] References Cited

U.S. PATENT DOCUMENTS

| | | | |
|---|---|---|---|
| 3,455,898 | 7/1969 | Seefelder et al. | 537/788 |
| 3,573,273 | 3/1971 | Seefelder et al. | 534/788 |
| 3,962,209 | 6/1976 | Gotteschlich et al. | 534/856 X |
| 3,994,679 | 11/1976 | Greenhalgh et al. | 534/573 |
| 3,995,994 | 12/1976 | Greenhalgh et al. | 534/573 |
| 4,062,642 | 12/1977 | Deucker et al. | 534/788 X |
| 4,211,696 | 7/1980 | Baird et al. | 534/753 |
| 4,321,055 | 3/1982 | Hansen et al. | 534/573 X |
| 4,464,181 | 8/1984 | Degen et al. | 534/573 X |
| 4,523,926 | 6/1985 | Brandt et al. | 534/573 X |
| 4,537,597 | 8/1985 | Bergmann et al. | 534/573 X |
| 4,681,932 | 7/1989 | Kruckenberg et al. | 534/788 X |
| 4,689,050 | 8/1987 | Hahnke et al. | 8/639 |

FOREIGN PATENT DOCUMENTS

| | | | |
|---|---|---|---|
| 0147783 | 7/1985 | European Pat. Off. | 534/573 |
| 3004652 | 8/1981 | Fed. Rep. of Germany | 534/573 |
| 58-40360 | 3/1983 | Japan | 534/573 |
| 58-215457 | 12/1983 | Japan | 534/856 |
| 1578733 | 11/1980 | United Kingdom | 534/573 |
| 2108141 | 5/1983 | United Kingdom | 53/573 |
| 2178751 | 7/1986 | United Kingdom | 534/573 |

Primary Examiner—Robert W. Ramsuer
Assistant Examiner—Fiona T. Powers
Attorney, Agent, or Firm—Sprung Horn Kramer & Woods

[57] ABSTRACT

Mixtures of dyestuffs of the formulae I to IV

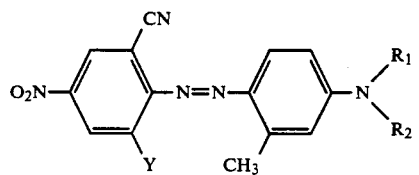

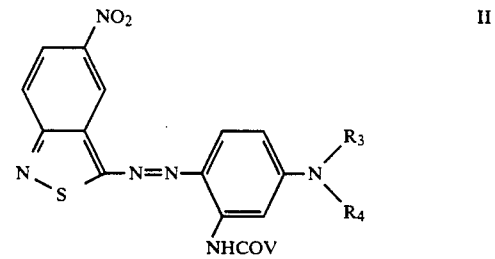

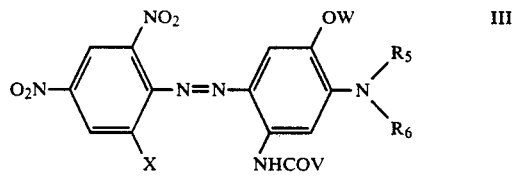

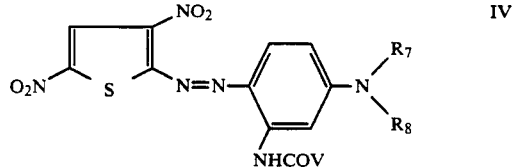

wherein the radicals have the meanings customary in dyestuff chemistry, are excellent substitute products for the expensive anthraquinone dyestuff Disperse Blue 56.

7 Claims, No Drawings

MIXTURES OF BLUE AZO DISPERSE DYESTUFFS

This application is a continuation, of application Ser. No. 362,912, filed Jun. 8, 1989, now abandoned.

The present invention relates to mixtures of azo dyestuffs for dyeing hydrophobic synthetic fibres which are suitable for example as substitutes for anthraquinoid C.I. Disperse Blue 56 (C.I. No. 63 285) or for dyestuffs with a hue angle $h_{ab}$ of about 295° (based on a polyester dyeing in a 1/1 standard depth of shade according to DIN 5033/3).

Disperse Blue 56 is regarded worldwide as an important blue disperse dyestuff since it produces particularly bright reddish blue dyeings with high light fastness on the abovementioned fibre materials. On the other hand this dyestuff does display a number of disadvantages:

As with almost all anthraquinone dyestuffs Disperse Blue 56 has a low colouring strength which leads to a considerable increase in cost especially where high depths of colour are required.

When dyeing mixtures of polyester fibres and wool, cotton and regenerated cellulose, these accompanying fibres become highly soiled. Even reductive aftertreatment does not completely remove this soiling.

When dyeing is carried out by means of modern rapid dyeing methods there is a high risk of uneven dyeing. Disperse Blue 56 is one of those types of disperse blue dyestuffs which even out particularly poorly, unless an excessive dyeing time is employed for subsequent levelling.

A further disadvantage is the sensitivity of Disperse Blue 56 towards metal ions—in particular copper—in the dye bath, for which reason complexing agents frequently have to be added to the latter.

In order to at least partly eliminate the deficiencies of the anthraquinone dyestuff it has already been proposed to replace Disperse Blue 56 by selected blue azo dyestuffs (cf. O. Annen. R. Egli, R. Hasler, B. Henzi, H. Jakob and P. Matzinger REV. PROGR. COLORATION, 72 Vol 17 (1987)) and by special mixtures of azo dyestuffs (cf. DE-A 3,347,572=U.S. Pat. No. 4,608,050).

In addition blends of the expensive anthraquinone dyestuff with inexpensive azo dyestuffs as well as mixtures of other anthraquinone dyestuffs with azo compounds have been recommended as "Blue 56 substitutes" (cf. DE-A 3,023,330=U.S. Pat. No. 4,374,642 and DE-A 3,043,184).

Apart from the fact that these blends represent a step in the wrong direction by the very nature of the problems they attempt to solve, none of the abovementioned proposals have succeeded in completely replacing Disperse Blue 56, since the substitute products do not attain the high quality of the anthraquinone dyestuff.

It has now been found that a substitute product for Disperse Blue 56 which is equal and to some extent considerably superior in virtually all important properties can be obtained by using a dyestuff combination with a hue angle of 290°–300°, preferably 293°–297°, which combination is characterised in that it contains
a) at least one dyestuff of the formula (I)

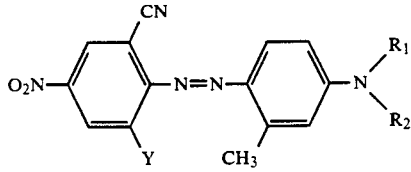

and
b) at least one dyestuff of the formulae II–IV

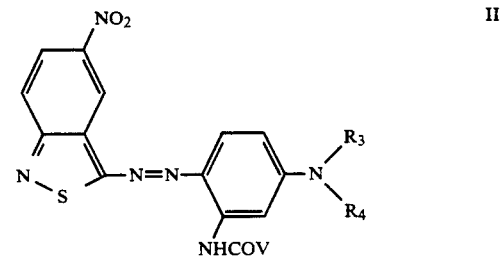

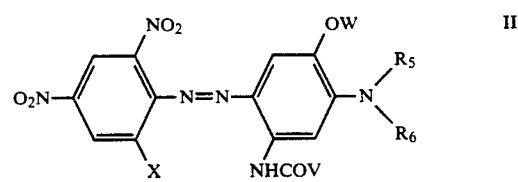

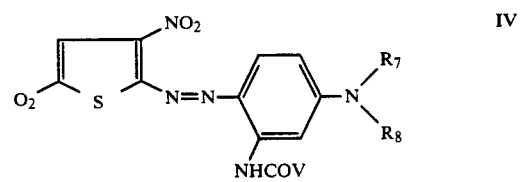

wherein—independently of one another—
X denotes Cl or Br,
Y denotes $NO_2$ or CN,
W denotes alkyl, aralkyl or alkoxyalkyl,
V denotes H, alkyl, aryl or alkoxy,
$R_1$ denotes alkyl, aralkyl, alkoxyalkyl or alkenyl,
$R_2$ denotes $R_1$, chloroalkyl, aryloxyalkyl or alkoxycarbonylalkyl,
$R_3$ denotes alkyl, aralkyl, alkoxyalkyl, hydroxyalkyl, aryloxyalkyl or alkenyl,
$R_4$ denotes $R_3$, $C_2$–$C_4$-chloroalkyl or alkoxycarbonylalkyl,
$R_5$ denotes alkyl, alkenyl or aralkyl
$R_6$ denotes $R_5$ or alkoxyalkyl,
$R_7$ denotes alkyl, aralkyl, alkoxyalkyl, hydroxyalkyl, aryloxyalkyl, chloroalkyl, alkoxycarbonylalkyl, alkenyl or acyloxyalkyl and
$R_8$ denotes $R_7$,
wherein acyl radicals are alkylcarbonyl or arylcarbonyl radicals, alkyl, alkenyl and alkoxy radicals, in whatever connection they are mentioned, are those containing 1-4 C-atoms, and aryl radicals, in whatever connection they are mentioned, are phenyl radicals which can be substituted by Cl or $C_1$–$C_4$-alkyl.

Preferred dyestuffs are those of the abovementioned formulae, in which
Y denotes $NO_2$ or CN,
X denotes Cl or Br,
W denotes alkyl or alkoxyalkyl,
V denotes alkyl, aryl or alkoxy, $R_1$ denotes alkyl, alkoxyalkyl or alkenyl,
$R_2$ denotes $R_1$, aralkyl or aryloxyalkyl,
$R_3$ denotes alkyl, aralkyl, alkoxyalkyl or alkenyl,
$R_4$ denotes $R_3$,
$R_5$ denotes alkyl or alkenyl,
$R_6$ denotes alkyl, alkenyl or aralkyl,
$R_7$ denotes alkyl, aralkyl, alkoxyalkyl, aryloxyalkyl or alkenyl and
$R_8$ denotes $R_7$, the abovementioned radicals having the specific meanings stated above.

Particularly preferred dyestuffs are those of the abovementioned formula in which
Y denotes $NO_2$ or CN,
X denotes Cl or Br,
W denotes alkyl,
V denotes alkyl,
$R_1$ denotes alkyl,
$R_2$ denotes $R_1$, alkoxyalkyl or aralkyl,
$R_3$ denotes alkoxyalkyl,
$R_4$ denotes $R_3$ or alkyl,
$R_5$ denotes alkyl,
$R_6$ denotes $R_5$,
$R_7$ denotes alkyl and
$R_8$ denotes $R_7$ or alkoxyalkyl,
the abovementioned radicals having the specific meanings stated above.

Particularly suitable dyestuffs are those of the formulae I–IV in which
Y denotes CN,
X denotes Br or Cl,
W denotes methyl,
V denotes methyl or ethyl,
$R_1$ and $R_2$ denote ethyl, n-propyl or n-butyl,
$R_3$ and $R_4$ denote methoxyethyl,
$R_5$ and $R_6$ denote ethyl or n-propyl and
$R_7$ and $R_8$ denote ethyl or n-propyl.

The dyestuffs of the formulae I–IV are known or can be obtained easily by known methods and are described for example in the following patent literature: DE-A 1,290,915=U.S. Pat. No. 4,105,655; DE-A 3,425,127=U.S. Pat. No. 4,681,932; DE-A 2,818,653=GB-A 1,582,743; DE-A 2,304,218=U.S. Pat. No. 4,079,050.

The individual dyestuffs listed in the following tables can be mentioned as examples.

TABLE 1

Dyestuffs of formula I

| $R_1$ | $R_2$ | $R_1$ | $R_2$ |
|---|---|---|---|
| $CH_3$ | $CH_3$ | $-C_2H_5$ | $-CH_2-CH_2-O-CH_3$ |
| $CH_3$ | $C_2H_5$ | $-C_2H_5$ | $-CH_2-CH_2-OC_2H_5$ |
| $CH_3$ | $CH_2-CH_2-CH_3$ | $-C_2H_5$ | $-CH_2-CH_2-O-CH_2-CH_2-CH_3$ |
| $CH_3$ | $CH-(CH_3)_2$ | $-C_2H_5$ | $-CH_2-CH_2-Cl$ |
| $CH_3$ | $-CH_2-CH_2-CH_2-CH_3$ | $-C_2H_5$ | 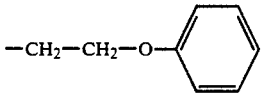 |
| $CH_3$ | $-CH_2-CH=CH_2$ | $-C_2H_5$ | 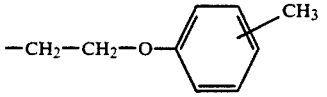 |
| $CH_3$ | 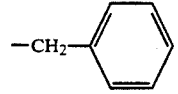 | $-C_2H_5$ | 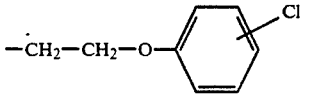 |
| $CH_3$ | 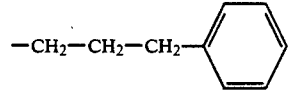 | | |
| $CH_3$ | $-CH_2-CH_2-O-CH_3$ | $-CH_2-CH_2-CH_3$ | $CH_2-CH_2-CH_3$ |
| $CH_3$ | $-CH_2-CH_2-OC_2H_5$ | $-CH_2-CH_2-CH_3$ | $CH-(CH_3)_2$ |
| $CH_3$ | $-CH_2-CH_2-O-CH_2-CH_2-CH_3$ | $-CH_2-CH_2-CH_3$ | $-CH_2-CH_2-CH_2-CH_3$ |
| $CH_3$ | $-CH_2-CH_2-Cl$ | $-CH_2-CH_2-CH_3$ | $-CH_2-CH=CH_2$ |
| $CH_3$ | 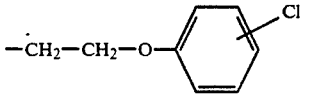 | $-CH_2-CH_2-CH_3$ | 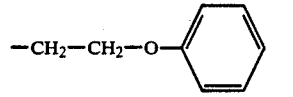 |
| $CH_3$ | 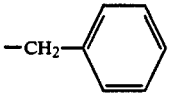 | $-CH_2-CH_2-CH_3$ | 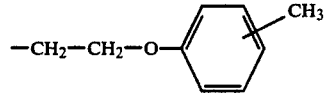 |
| $CH_3$ | 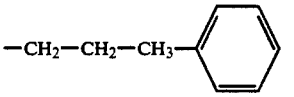 | $-CH_2-CH_2-CH_3$ | $-CH_2-CH_2-O-CH_3$ |
| $C_2H_5$ | $C_2H_5$ | $-CH_2-CH_2-CH_3$ | $-CH_2-CH_2-OC_2H_5$ |

TABLE 1-continued

Dyestuffs of formula I

| R₁ | R₂ | R₁ | R₂ |
|---|---|---|---|
| C₂H₅ | CH₂—CH₂—CH₃ | —CH₂—CH₂—CH₃ | —CH₂—CH₂—O—CH₂—CH₂—CH₃ |
| C₂H₅ | CH—(CH₃)₂ | —CH₂—CH₂—CH₃ | —CH₂—CH₂—Cl |
| C₂H₅ | —CH₂—CH₂—CH₂—CH₃ | —CH₂—CH₂—CH₃ | —CH₂—CH₂—O—C₆H₅ |
| C₂H₅ | —CH₂—CH=CH₂ | —CH₂—CH₂—CH₃ | —CH₂—CH₂—O—C₆H₄—CH₃ |
| C₂H₅ | —CH₂—C₆H₅ | —CH₂—CH₂—CH₃ | —CH₂—CH₂—O—C₆H₄—Cl |
| C₂H₅ | —CH₂—CH₂—CH₂—C₆H₅ | | |
| CH₂—(CH₂)₂—CH₃ | —CH—(CH₃)₂ | CH₂—(CH₂)₂—CH₃ | —CH₂—CH₂—OC₂H₅ |
| CH₂—(CH₂)₂—CH₃ | —CH₂—CH₂—CH₂—CH₃ | CH₂—(CH₂)₂—CH₃ | —CH₂—CH₂—O—CH₂—CH₂—CH₃ |
| CH₂—(CH₂)₂—CH₃ | —CH₂—CH=CH₂ | CH₂—(CH₂)₂—CH₃ | —CH₂—CH₂—Cl |
| CH₂—(CH₂)₂—CH₃ | —CH₂—C₆H₅ | CH₂—(CH₂)₂—CH₃ | —CH₂—CH₂—O—C₆H₅ |
| CH₂—(CH₂)₂—CH₃ | —CH₂—CH₂—CH₂—C₆H₅ | CH₂—(CH₂)₂—CH₃ | —C₆H₄—CH₃ |
| CH₂—(CH₂)₂—CH₃ | —CH₂—CH₂—O—CH₃ | CH₂—(CH₂)₂—CH₃ | —C₆H₄—Cl |

TABLE 2

Dyestuffs of formula II

| V | R₃ | R₄ |
|---|---|---|
| CH₃ | CH₃ | CH3 |
| CH₃ | C₂H₅ | C2H5 |
| CH₃ | CH₂—CH₂—CH₃ | CH₂—CH₂—CH₃ |
| CH₃ | C₂H₅ | CH2—CH2—O—CH3 |
| CH₃ | C₂H₅ | CH2—CH2—O—C2H5 |
| CH₃ | —(CH₂)₂—CH₃ | CH₂—CH₂—O—CH₃ |
| CH₃ | —(CH₂)₂—CH₃ | CH₂—CH₂—O—C2H5 |
| CH₃ | CH₂—CH₂—OCH₃ | CH₂—CH₂—OCH₃ |
| CH₃ | CH₂—CH₂—O—C₂H₅ | CH₂—CH₂—OC₂H₅ |
| C₂H₅ | CH₃ | CH3 |
| C₂H₅ | C₂H₅ | C2H5 |
| C₂H₅ | CH₂—CH₂—CH₃ | CH₂—CH₂—CH₃ |
| C₂H₅ | C₂H₅ | CH2—CH2—O—CH3 |
| C₂H₅ | C₂H₅ | CH2—CH2—O—C2H5 |
| C₂H₅ | —(CH₂)₂—CH₃ | CH₂—CH₂—O—CH₃ |
| C₂H₅ | —(CH₂)₂—CH₃ | CH₂—CH₂—O—C2H5 |
| C₂H₅ | CH₂—CH₂—OCH₃ | CH₂—CH₂—OCH₃ |
| C₂H₅ | CH₂—CH₂—O—C₂H₅ | CH₂—CH₂—OC₂H₅ |
| CH₂—CH₂—CH₃ | CH₃ | CH3 |
| CH₂—CH₂—CH₃ | C₂H₅ | C2H5 |
| CH₂—CH₂—CH₃ | CH₂—CH₂—CH₃ | CH₂—CH₂—CH₃ |
| CH₂—CH₂—CH₃ | C₂H₅ | CH2—CH2—O—CH3 |
| CH₂—CH₂—CH₃ | C₂H₅ | CH2—CH2—O—C2H5 |
| CH₂—CH₂—CH₃ | —(CH₂)₂—CH₃ | CH₂—CH₂—O—CH₃ |
| CH₂—CH₂—CH₃ | —(CH₂)₂—CH₃ | CH₂—CH₂—O—C2H5 |
| CH₂—CH₂—CH₃ | CH₂—CH₂—OCH₃ | CH₂—CH₂—OCH₃ |
| CH₂—CH₂—CH₃ | CH₂—CH₂—O—C₂H₅ | CH₂—CH₂—OC₂H₅ |
| CH₂—CH₂—CH₂—CH₃ | CH₃ | CH3 |
| CH₂—CH₂—CH₂—CH₃ | C₂H₅ | C2H5 |
| CH₂—CH₂—CH₂—CH₃ | CH₂—CH₂—CH₃ | CH₂—CH₂—CH₃ |
| CH₂—CH₂—CH₂—CH₃ | C₂H₅ | CH2—CH2—O—CH3 |
| CH₂—CH₂—CH₂—CH₃ | C₂H₅ | CH₂—CH₂—O—C₂H₅ |
| CH₂—CH₂—CH₂—CH₃ | —(CH₂)₂—CH₃ | CH₂—CH₂—O—CH₃ |
| CH₂—CH₂—CH₂—CH₃ | —(CH₂)₂—CH₃ | CH₂—CH₂—O—C₂H₅ |
| CH₂—CH₂—CH₂—CH₃ | CH₂—CH₂—OCH₃ | CH₂—CH₂—OCH₃ |
| CH₂—CH₂—CH₂—CH₃ | CH₂—CH₂—O—C₂H₅ | CH₂—CH₂—OC₂H₅ |

TABLE 2-continued

| | Dyestuffs of formula II | |
|---|---|---|
| V | $R_3$ | $R_4$ |
| $CH_2-CH_3$ | | |

TABLE 3

| | | Dyestuffs of formula III | | |
|---|---|---|---|---|
| V | W | $R_5$ | $R_6$ | X |
| $CH_3$ | $CH_3$ | $C_2H_5$ | $C_2H_5$ | Cl |
| $CH_3$ | $CH_3$ | $CH_2-CH_2-CH_3$ | $CH_2-CH_2-CH_3$ | Cl |
| $CH_3$ | $CH_3$ | $C_2H_5$ | $C_2H_5$ | Br |
| $CH_3$ | $CH_3$ | $CH_2-CH_2-CH_3$ | $CH_2-CH_2-CH_3$ | Br |
| $C_2H_5$ | $CH_3$ | $C_2H_5$ | $C_2H_5$ | Cl |
| $C_2H_5$ | $CH_3$ | $C_2H_5$ | $C_2H_5$ | Br |
| $C_2H_5$ | $CH_3$ | $CH_2-CH_2-CH_3$ | $CH_2-CH_2-CH_3$ | Cl |
| $C_2H_5$ | $CH_3$ | $CH_2-CH_2-CH_3$ | $CH_2-CH_2-CH_3$ | Br |
| $CH_2-CH_2-CH_3$ | $CH_3$ | $C_2H_5$ | $C_2H_5$ | Cl |
| $CH_2-CH_2-CH_3$ | $CH_3$ | $C_2H_5$ | $C_2H_5$ | Br |
| $CH_2-CH_2-CH_3$ | $CH_3$ | $CH_2-CH_2-CH_3$ | $CH_2-CH_2-CH_3$ | Cl |
| $CH_2-CH_2-CH_3$ | $CH_3$ | $CH_2-CH_2-CH_3$ | $CH_2-CH_2-CH_3$ | Br |
| $-(CH_2)_3-CH_3$ | $CH_3$ | $C_2H_5$ | $C_2H_5$ | Cl |
| $-(CH_2)_3-CH_3$ | $CH_3$ | $C_2H_5$ | $C_2H_5$ | Br |
| $-(CH_2)_3-CH_3$ | $CH_3$ | $CH_2-CH_2-CH_3$ | $CH_2-CH_2-CH_3$ | Cl |
| $-(CH_2)_3-CH_3$ | $CH_3$ | $CH_2-CH_2-CH_3$ | $CH_2-CH_2-CH_3$ | Br |

TABLE 4

| | Dyestuffs of formula IV | |
|---|---|---|
| V | $R_7$ | $R_8$ |
| $CH_3$ | $C_2H_5$ | $C_2H_5$ |
| $C_2H_5$ | $C_2H_5$ | $C_2H_5$ |
| $CH_2-CH_2-CH_3$ | $C_2H_5$ | $C_2H_5$ |
| $(CH_2)_3-CH_3$ | $C_2H_5$ | $C_2H_5$ |
| $CH_3$ | $CH_2-CH_2-CH_3$ | $CH_2-CH_2-CH_3$ |
| $C_2H_5$ | $CH_2-CH_2-CH_3$ | $CH_2-CH_2-CH_3$ |
| $CH_2-CH_2-CH_3$ | $CH_2-CH_2-CH_3$ | $CH_2-CH_2-CH_3$ |
| $-(CH_2)_3-CH_3$ | $CH_2-CH_2-CH_3$ | $CH_2-CH_2-CH_3$ |
| $CH_3$ | $CH_2-CH_2-CH_3$ | $-CH_2-CH_2-OCH_3$ |
| $CH_3$ | $CH_2-CH_2-CH_3$ | $-CH_2-CH_2-OC_2H_5$ |

The proportion by weight of the individual mixture components in the mixture according to the invention is, in general:
20 to 90% of component I,
0 to 80% of component II,
0 to 80% of component III and
0 to 80% of component IV
with the proviso that at least one of dyestuffs II to IV makes up 100% together with dyestuff I.

In another type of mixture the proportions are as follows:
10 to 90% of component I,
10 to 80% of component III and
10 to 80% of component IV.

Two component mixtures of I with II, III or IV in the following proportions.
a) 25 to 80% of component I, 20 to 75% of component II,
b) 25 to 80% of component I, 20 to 75% of component III,
c) 30 to 90% of component I, 10 to 70% of component IV,
are preferred.

Particularly preferred mixtures are those of dye-stuff A with dyestuffs B, C and D:

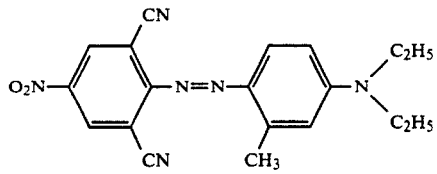

(A)

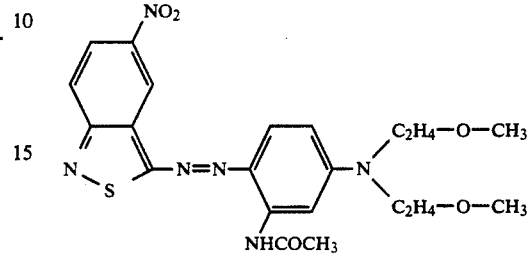

(B)

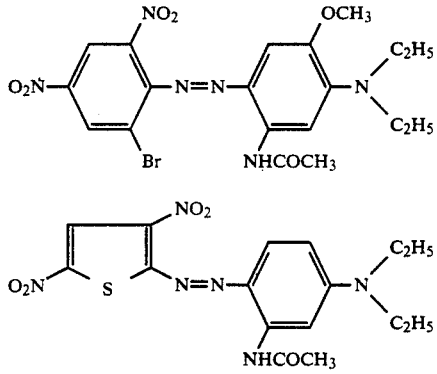

(C)

(D)

the following mixing ratios being preferred:
a) 10 to 90% dyestuff A, 10 to 90% dyestuff B.
b) 50 to 70% dyestuff A, 30 to 50% dyestuff B.
c) 55 to 65% dyestuff A, 35 to 45% dyestuff B.
d) 40 to 70% dyestuff A, 15 to 45% dyestuff B, 5 to 30% dyestuff C.
e) 40 to 70% dyestuff A, 15 to 45% dyestuff B, 5 to 20% dyestuff D.
f) 50 to 75% dyestuff A, 10 to 35% dyestuff C, 5 to 30% dyestuff D.
g) 45 to 75% dyestuff A, 30 to 60% dyestuff C.
h) 52 to 64% dyestuff A, 38 to 48% dyestuff C.
i) 60 to 85% dyestuff A, 15 to 40% dyestuff D.

The new dyestuff mixtures can be produced by various methods:
1. by mixing the separately prepared and formulated individual components, or
2. by jointly formulating the separately prepared individual dyestuff components.

The "cyanation" of ortho-halogen azo dyestuffs and the dicyan dyestuffs thereby obtained are—as such—generally known (cf. DE-A 1,544,563=U.S. Pat. No. 3,962,209 and DE-A 3,009,635).

The formulating process for producing marketable preparations is also carried out by methods known per se.

The new dyestuff mixtures are particulary suitable for dyeing polyester and cellulose ester fibres and produce very bright reddish blue dyeings with very good light and wash fastness properties.

An additional advantage is the low degree of soiling of adjacent fabrics in the dyeing of polyester mixed fabrics.

In the following examples "parts" and "%" denote parts by weight and percentage by weight, respectively.

EXAMPLE 1

A dyeing preparation of
11.2 parts of dyestuff A,
9.9 parts of dyestuff B,
25.6 parts of a commercially available lignin sulphonate
46.4 parts of a commercially available dispersing agent (for example a condensation product of formaldehyde, naphthalene and sulphuric acid),
0.2 parts of a commercially available wetting agent,
0.7 parts of a commercially available dedusting agent and
6.0 parts of residual mixture,
is produced by bead-milling and subsequent spray drying.

100 parts of a polyester fabric (polyethylene terephthalate) are dyed for 30 to 45 minutes at 125° to 130° C. with 1.3 g of the dyestuff preparation described above in a dye bath which has been adjusted to a pH value of 4.5 with sodium phosphate and acetic acid (liquor ratio 1:10 to 1:40).

Bright reddish-blue dyeings with good fastness properties are obtained.

EXAMPLE 2

100 parts of a polyester fabric are dyed for 30 minutes at 90° to 105° C. with 1.3 parts of the dyestuff preparation described above in a dye bath which contains 5 g/l of a commercially available carrier (for example based on aromatic carboxylic esters) and has been adjusted to a pH of 4.5 with sodium phosphate and acetic acid. Full, deep blue dyeings with good fastness properties are obtained.

EXAMPLE 3

200 parts of a polyester/(polyethylene terephthalate) cotton mixed fabric 50/50 are dyed for 30 to 45 minutes at 125° to 135° C. with 1.3 parts of the dye preparation described above in a dye bath which has been adjusted to a pH of 4.5 with sodium phosphate and acetic acid (liquor ratio 1:10 to 1:40). Bright blue dyeings with good fastness properties are obtained, the adjacent cotton material being only slightly soiled.

EXAMPLE 4

200 parts of a polyester/wool mixed fabric 50/50 are dyed for 30 minutes at 90° to 105° C. with 1.3 parts of the dyestuff preparation described above in a dye bath which contains 5 g/l of a commercially available carrier (for example based on aromatic carboxylic esters) and has been adjusted to a pH of 4.5 with sodium phosphate and acetic acid. Full, deep blue dyeings with good fastness properties are obtained.

Similar results are obtained using the following mixtures:

EXAMPLE 5

55% of dyestuff I (in which $R_1$ and $R_2$=n-butyl)
45% of dyestuff B

EXAMPLE 6

59% of dyestuff A
41% of dyestuff B

EXAMPLE 7

55% of dyestuff A
31% of dyestuff B
14% of dyestuff C

EXAMPLE 8

60% of dyestuff A
31% of dyestuff B
9% of dyestuff D

EXAMPLE 9

66% of dyestuff A
22% of dyestuff C
12% of dyestuff D

EXAMPLE 10

60% of dyestuff A
40% of dyestuff C

EXAMPLE 11

72% of dyestuff A
28% of dyestuff D

EXAMPLE 12

62% of dyestuff A
38% of dyestuff B

EXAMPLE 13

53% of dyestuff A
47% of dyestuff B

We claim:

1. A mixture of azo disperse dyestuffs having a hue angle $h_{ab}$ of 290° to 300°, based on a polyester dyeing in a 1/1 standard depth of shade according to DIN 5033/Part 3, comprising a) at least one dyestuff of the formula (I)

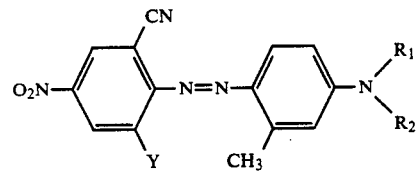

and b) at least one dyestuff selected from the group consisting of compounds of the formula

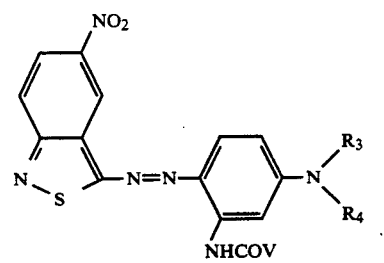

wherein, independently of one another,
Y denotes $NO_2$ or CN,
V denotes alkyl, or alkoxy,
$R_1$ denotes alkyl, or alkoxyalkyl,
$R_2$ denotes chloralkyl, aryloxyalkyl, alkoxycarbonylalkyl, alkyl, aralkyl, alkoxyalkyl or alkenyl,
$R_3$ denotes alkyl, aralkyl, alkoxyalkyl, or aryloxyalkyl,
$R_4$ denotes alkoxycarbonylalkyl, alkyl or alkoxyalkyl, wherein alkyl, alkenyl and alkoxy radicals, in whatever connection they are mentioned, are those with 1–4 C-atoms and aryl radicals, in whatever connection they are mentioned, are phenyl radicals which are unsubstituted or substituted by Cl or $C_1$–$C_4$-alkyl.

2. A mixture of azo disperse dyestuffs according to claim 1, wherein
   Y denotes $NO_2$ or CN,
   V denotes alkyl,
   $R_1$ denotes alkyl,
   $R_2$ denotes $R_1$, alkoxyalkyl or aralkyl,
   $R_3$ denotes alkoxyalkyl,
   $R_4$ denotes alkyl or alkoxyalkyl,
the above mentioned radicals having the specific meanings stated above.

3. A mixture of azo disperse dyestuffs according to claim 1, wherein in the formulae mentioned therein
   Y denotes CN,
   V denotes ethyl or methyl,
   $R_1$ and $R_2$ denote ethyl, n-propyl or n-butyl and
   $R_3$ and $R_4$ denote methoxyethyl.

4. A mixture of azo disperse dyestuffs according to claim 1, wherein the proportion by weight of component I is 20 to 90% and that of component II is 10 to 80% with the proviso that the dyestuff II makes up 100% together with dyestuff I.

5. A mixture of azo disperse dyestuffs according to claim 1, wherein the proportion by weight of component I is 20 to 90% and that of component II is 10 to 80%.

6. A mixture of azo disperse dyestuffs according to claim 1, wherein the proportion by weight of component I is 25 to 80% and that of component II is 20 to 75%.

7. A mixture of the azo disperse dyestuffs according to claim 1, comprising a dyestuff of the formula (A)

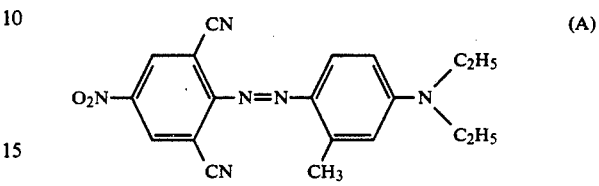

and a dyestuff of the formula (B)

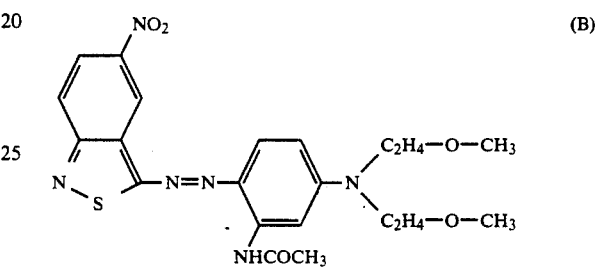

* * * * *